Sept. 27, 1932. C. ASCHENBRENNER 1,879,866
MECHANISM OF FILM PROPULSION
Filed Oct. 4, 1929
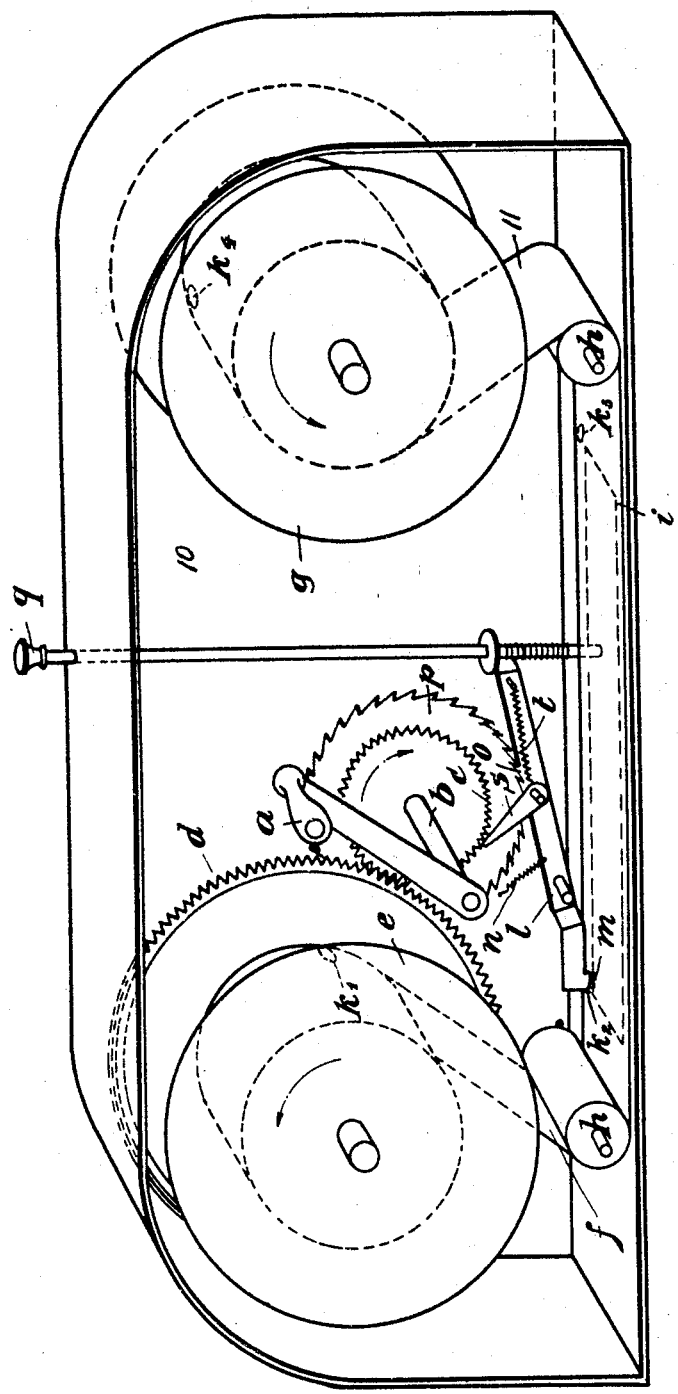
Claus Aschenbrenner
INVENTOR
by Otto Krank
his ATTY.

Patented Sept. 27, 1932

1,879,866

UNITED STATES PATENT OFFICE

CLAUS ASCHENBRENNER, OF MUNICH, GERMANY, ASSIGNOR TO THE FIRM PHOTO-GRAMMETRIE G. M. B. H., OF MUNICH, GERMANY

MECHANISM OF FILM PROPULSION

Application filed October 4, 1929, Serial No. 397,205, and in Germany October 8, 1928.

My invention relates to improvements in a mechanism for imparting longitudinal displacement in a photographic film used in cameras adapted to take a series of successive exposures from a flying machine in motion.

Cameras used in this work require the most reliable mechanism in order to insure exact longitudinal displacement of the film for each successive exposure and it has been found that the devices now in use are either unreliable as regards the proper measured movement of the film where a friction drive is utilized, or destructive to the film material where sprocket wheels engage in perforations in the film to not only impart movement to the latter but to stop its movement as well.

With the foregoing in mind, it is the purpose of the present invention to provide a mechanism for imparting the required movement to a film of this character and to bring it to the exact successive stop positions without in any way impairing the condition of the film. I accomplish this purpose by means of the device hereinafter described in the specification, set forth in the appended claim and illustratively exemplified in the accompanying drawing, which is a perspective view of a casing with one of its side walls removed to disclose the enclosed mechanism.

Referring to the drawing in detail, 10 denotes the housing which is a substantially rectangular member having a rectangular opening or slot $i$ in its bottom wall, the sides of the slot forming the frame for the picture. Spaced from opposite ends of the slot $i$ and journaled in the side walls of the housing are rollers $h$ each of which has its periphery at one point spaced from the bottom wall a distance equal to the thickness of the film strip 11 so that the latter passes between the rollers $h$ directly over the opening $i$. At one end of the housing 10 the film strip passes over the roller $h$ from a spool or reel $g$ which carries the unexposed film and which turns on its axle in the side walls of the housing. The other roller $h$ delivers the film to a take-up spool or reel $e$ journaled in the sides of the housing at the end of the latter opposite that occupied by the spool $g$.

The mechanism for operating the take-up spool $e$ comprises a spur gear $d$ mounted on the axle of the spool and turning with the latter. The gear $d$ meshes with a small drive gear or pinion $c$, which is mounted to turn with a drive shaft $b$, and which is attached to a toothed ratchet wheel $p$. The shaft $b$ rotates in bearings in the side walls of the housing and at one end outside the wall, it is provided with a crank and handle $a$. Rotary movement of the crank $a$ in clockwise direction will impart movement to the shaft $b$ and gear or pinion $c$ which in turn imparts rotary movement in the opposite direction to the take-up spool $e$ through the gear $d$.

The film according to the present invention is provided along preferably one longitudinal marginal edge with a series of perforations $k_1$, $k_2$, $k_3$, $k_4$ which are spaced from each other a distance equal to the length of each successive picture to be taken. The mechanism for controlling the exact positioning of the film comprises a lever $l$ arranged over the perforated margin of the film and pivotally supported in a side wall of the housing. The shorter end of the lever $l$ is provided with a downwardly directed projection or stop lug $m$ adapted to ride over the film and drop into each perforation $k_1$ etc. as hereinafter described. The opposite end of the lever has a right angle projection which engages under a flange or disc $r$ of an upright rod $q$ slidably mounted in the bottom and top walls of the housing. The upper end of the rod projects above the top wall and is provided with a button, while the portion of the rod between the disc $r$ and the inner surface of the bottom wall carries a spring to yieldably urge the rod to its uppermost position.

The longer portion of the lever $l$ carries a pivotally supported dog $s$ which at its free end, engages the teeth of the pinion gear $c$ along the lower portion of its periphery. The dog $s$ is yieldably held in engagement with the pinion $c$ by means of a spring $t$ which is attached to the dog at one end and to a point on the lever $l$ adjacent the end under the disc $r$ at the other end. In order to hold the end of the lever in contact with the under side of the disc $r$ and the projection $m$ in contact with the margin of the film during movement thereof, and in a perforation $k_1$ etc. when the film is not in movement, I provide the portion of the lever between its pivot and the dog $s$ with a spring $n$ which has its fixed end at a point above the lever. The entire movement of the take-up reel $e$ and drive is brought to a halt when the projection $m$ drops into a perforation $k_1$ etc. and the longer end of the lever is raised, by means of a beveled tooth $o$ projecting from the upper side of the lever and being disposed to engage in a tooth of the ratchet wheel $p$.

As will be gathered from the foregoing, the mechanism for advancing the film is quite separate from that contemplated to stop its movement at the desired position, whereby practically no strain is absorbed by the film. Assuming the device is to be set in operation from the position shown in the drawing, the operator depresses the rod $q$ which through the disc $r$ causes the longer arm of the lever $l$ to be lowered and the shorter arm to be raised, the latter withdrawing the projection $m$ from the perforation in the film. Simultaneously with the release of the film the tooth $o$ is withdrawn from the ratchet wheel $p$ and the shaft $b$ is permitted to rotate, the dog $s$ being drawn to the right by its spring $t$ to hold the lever released from the film. Continued rotation of the handle $a$ causes the film to wind up upon the reel $e$ until the next perforation $k_3$ is drawn under the projection $m$ thus bringing the succeeding section of unexposed film before the opening $i$. At this point, the projection $m$ drops into the perforation and stops further movement of the film, but before any strain has been exerted on the latter by the projection entering the perforation, the tooth $o$ has engaged a tooth of the ratchet $p$ and arrested further rotary movement of the driving shaft $b$ and reel $e$. To prevent rotation of the shaft $b$ before the projection $m$ has been completely withdrawn from the perforation, the dog $s$ is carried towards the left to remain in engagement with the gear until the disengaged perforation of the film may advance out of register with the projection.

Having now described my invention and the manner in which the device operates, what I claim and desire to secure by Letters Patent is:

A device for feeding and controlling perforated photographic film, comprising a driven take-up spool, a detent yieldably urged into contact with said film and into the path of the perforations thereof, said detent having a toothed edge and a pivotally mounted dog yieldably urged to upright position, a rotary drive for said spool, comprising a gear meshing with the spool and engaged by the dog in its upright position to hold the detent released from the film, a toothed wheel engaged by the toothed edge of the detent to prevent movement of the drive in winding direction, and means to release the detent and toothed wheel and to permit the dog to engage the gear until the disengaged perforation of the film is advanced out of register with the detent.

In testimony whereof I hereunto affix my signature.

CLAUS ASCHENBRENNER.